(12) United States Patent
Forster (10) Patent No.: US 11,120,324 B2
(45) Date of Patent: Sep. 14, 2021

(54) PLANAR CONDUCTIVE DEVICE THAT FORMS A COIL FOR AN RFID TAG WHEN FOLDED

(71) Applicant: AVERY DENNISON RETAIL INFORMATION SERVICES, LLC, Mentor, OH (US)

(72) Inventor: Ian J. Forster, Chelmsford (GB)

(73) Assignee: Avery Dennison Retail Information Services, LLC, Mentor, OH (US)

(*) Notice: Subject to any disclaimer, the term of this patent is extended or adjusted under 35 U.S.C. 154(b) by 0 days.

(21) Appl. No.: 16/169,190

(22) Filed: Oct. 24, 2018

(65) Prior Publication Data

US 2019/0122088 A1    Apr. 25, 2019

Related U.S. Application Data

(60) Provisional application No. 62/576,181, filed on Oct. 24, 2017.

(51) Int. Cl.
*G06K 19/077* (2006.01)
*H01Q 9/28* (2006.01)
*G06K 7/10* (2006.01)

(52) U.S. Cl.
CPC ..... *G06K 19/0779* (2013.01); *G06K 19/0775* (2013.01); *G06K 19/07771* (2013.01); *G06K 19/07792* (2013.01); *H01Q 9/28* (2013.01); *G06K 7/10336* (2013.01)

(58) Field of Classification Search
CPC ................. G06K 19/0779; G06K 19/07792
See application file for complete search history.

(56) References Cited

U.S. PATENT DOCUMENTS

| | | | | |
|---|---|---|---|---|
| 2,568,169 A | * | 9/1951 | Raczynski | H01F 17/045 336/223 |
| 4,621,231 A | * | 11/1986 | Heinrich | H01F 27/2804 29/602.1 |
| 5,375,321 A | * | 12/1994 | Rohatgi | H05K 1/0218 29/830 |
| 5,747,743 A | * | 5/1998 | Kato | H05K 1/028 174/254 |

(Continued)

FOREIGN PATENT DOCUMENTS

| | | | |
|---|---|---|---|
| DE | 10258670 | 6/2004 | |
| EP | 0786784 A1 | * 7/1997 | ......... H01F 27/2804 |

(Continued)

OTHER PUBLICATIONS

International Search Report and Written Opinion dated Jan. 28, 2019 issued in corresponding IA No. PCT/US2018/057251 filed Oct. 24, 2018.

(Continued)

*Primary Examiner* — Christle I Marshall (57) ABSTRACT

A planar conductor device and RFID chip are folded to create a coil to form an RFID tag. The result is the formation of a solenoid coil, not planar, which allows the device to be placed against metal. Specifically, the planar structure is folded into a concertina fold. After folding, a spiral conductor is formed in the Z direction, forming a coil with the RFID chip connected to both ends. This structure operates as a resonant RFID tag.

12 Claims, 7 Drawing Sheets

(56) References Cited

U.S. PATENT DOCUMENTS

| | | | |
|---|---|---|---|
| 7,540,428 B2* | 6/2009 | Baba | G06K 19/07749 |
| | | | 235/451 |
| 7,694,886 B2* | 4/2010 | Tan | G06K 19/07749 |
| | | | 235/487 |
| 7,915,707 B2* | 3/2011 | Dekker | H01L 23/49833 |
| | | | 257/528 |
| 9,024,198 B2* | 5/2015 | Kajiya | H05K 1/028 |
| | | | 174/254 |
| 9,178,279 B2* | 11/2015 | Ikemoto | G06K 19/07783 |
| 9,380,698 B1* | 6/2016 | Li | A61B 5/6824 |
| 9,585,245 B2* | 2/2017 | Li | A61B 5/6824 |
| 2004/0246099 A1 | 12/2004 | Tuttle | |
| 2007/0046475 A1 | 3/2007 | Carrender | |
| 2007/0236333 A1 | 10/2007 | Reuker | |
| 2008/0018424 A1 | 1/2008 | Takahata | |
| 2008/0122630 A1 | 5/2008 | Baba et al. | |
| 2009/0026751 A1 | 1/2009 | Rancien et al. | |
| 2010/0207841 A1* | 8/2010 | Carr | H01Q 9/0414 |
| | | | 343/906 |
| 2011/0186623 A1 | 8/2011 | Truesdale | |
| 2012/0013435 A1 | 1/2012 | Chapman | |
| 2012/0067962 A1 | 3/2012 | McDonald | |
| 2012/0144657 A1 | 6/2012 | Nietfeld | |
| 2012/0235870 A1 | 9/2012 | Forster | |
| 2014/0055313 A1* | 2/2014 | Kobayashi | G06K 7/10316 |
| | | | 343/788 |
| 2015/0214627 A1* | 7/2015 | Komoriya | H01Q 9/0471 |
| | | | 343/895 |
| 2017/0091495 A1 | 3/2017 | Horie et al. | |
| 2019/0043663 A1* | 2/2019 | Walser | H01F 27/402 |
| 2020/0050916 A1* | 2/2020 | Forster | G06K 19/0779 |

FOREIGN PATENT DOCUMENTS

| | | | |
|---|---|---|---|
| EP | 1650697 | 4/2006 | |
| FR | 3002686 B1 * | 9/2016 | H01Q 1/36 |
| JP | 8-204432 | 8/1996 | |
| JP | 11134459 A * | 5/1999 | |
| WO | 2008/090714 | 7/2008 | |

OTHER PUBLICATIONS

International Preliminary Report on Patentability dated Apr. 28, 2020 issued in corresponding IA No. PCT/US2018/057251 filed Oct. 24, 2018.

* cited by examiner

PLANAR CONDUCTIVE DEVICE THAT FORMS A COIL FOR AN RFID TAG WHEN FOLDED

CROSS REFERENCE TO RELATED APPLICATION(S)

The present application claims priority to and the benefit of U.S. provisional utility patent Application No. 62/576,181 filed Oct. 24, 2017, which is incorporated herein by reference in its entirety.

BACKGROUND

The present invention relates generally to a planar conductor device and radio-frequency identification (RFID) chip that is folded to create a coil to form a RFID tag. The present subject matter is especially suitable for, but not limited to, both ultra-high frequency (UHF) and high frequency (HF) tags. However, it is to be appreciated that aspects of the present inventive subject matter are also equally amenable to other like applications.

Radio-frequency identification ("RFID") is the use of electromagnetic energy ("EM energy") to stimulate a responsive device (known as an RFID "tag" or transponder) to identify itself and in some cases, provide additionally stored data. RFID tags typically include a semiconductor device commonly called the "chip" on which are formed a memory and operating circuitry, which is connected to an antenna. Typically, RFID tags act as transponders, providing information stored in the chip memory in response to a radio frequency ("RF") interrogation signal received from a reader, also referred to as an interrogator. In the case of passive RFID devices, the energy of the interrogation signal also provides the necessary energy to operate the RFID device.

RFID tags may be incorporated into or attached to articles to be tracked. In some cases, the tag may be attached to the outside of an article with adhesive, tape, or other means and in other cases, the tag may be inserted within the article, such as being included in the packaging, located within the container of the article, or sewn into a garment. The RFID tags are manufactured with a unique identification number which is typically a simple serial number of a few bytes with a check digit attached. This identification number is incorporated into the tag during manufacture. The user cannot alter this serial/identification number and manufacturers guarantee that each serial number is used only once. This configuration represents the low-cost end of the technology in that the RFID tag is read-only and it responds to an interrogation signal only with its identification number. Typically, the tag continuously responds with its identification number. Data transmission to the tag is not possible. These tags are very low cost and are produced in enormous quantities.

Such read-only RFID tags typically are permanently attached to an article to be tracked and, once attached, the serial number of the tag is associated with its host article in a computer data base. Specifically, an object of the tag is to associate it with an article throughout the article's life in a particular facility, such as a manufacturing facility, a transport vehicle, a health care facility, a pharmacy storage area, or other environment, so that the article may be located, identified, and tracked, as it is moved. Tracking the articles through the facility can assist in generating more efficient dispensing and inventory control systems as well as improving work flow in a facility. This results in better inventory control and lowered costs.

Many RFID tags used today are passive in that they do not have a battery or other autonomous power supply and instead, must rely on the interrogating energy provided by an RFID reader to provide power to activate the tag. Passive RFID tags require an electromagnetic field of energy of a certain frequency range and certain minimum intensity in order to achieve activation of the tag and transmission of its stored data. Another choice is an active RFID tag; however, such tags require an accompanying battery to provide power to activate the tag, thus increasing the expense and the size of the tag and making them undesirable for use in a large number of applications.

Depending on the requirements of the RFID tag application, such as the physical size of the articles to be identified, their location, and the ability to reach them easily, tags may need to be read from a short distance or a long distance by an RFID reader. Furthermore, the read range (i.e., the range of the interrogation and/or response signals) of RFID tags is also limited.

Furthermore, when the RFID tags are attached to a conductive surface, typically the RFID tag cannot be read. Specifically, if the space between a dipole and its image is very small (less than one wavelength), then the total effective current between the dipole and its image is equal to zero. Thus, the total radiated field is negligible and therefore, the RFID tag is unable to capture data and power from the reader. This is a significant problem given that in many commercial applications it is desirable to apply the RFID tag to a metal or other type of conductive surface. What is needed therefore is an RFID tag device and/or system that allows the RFID tag to operate in proximity to metal surfaces or other types of conductive surfaces.

The present invention discloses a planar conductor device and RFID chip that is folded to create a coil to form an RFID tag. The result is the formation of a solenoid coil, not planar, which allows the device to be placed against metal.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one aspect thereof, comprises a planar conductor device (system and method) and RFID chip which is folded to create a coil to form an RFID tag. The device comprises a planar structure involving a meandering conductive trace formed by etching, laser cutting, die cutting, or any other suitable method. An RFID chip is then connected to the planar structure. The planar structure is then folded into a concertina fold. After folding, a spiral conductor is formed in the Z direction, forming a coil with the RFID chip connected to both ends. This structure operates as a resonant RFID tag.

In a preferred embodiment, the planar conductor device can be folded in various directions. For example, a web carrying the planar antenna can be folded in the cross-web direction or in the web direction to form the concertina coil elements. Further, the planar device can also be folded to produce two coils in series, which allows the spacing between the coils to be altered during folding. The multiple coils allow an increase in inductance to be achieved with two read zones, one zone over each coil with a null zone in between as the reader system equally passes current through the coils.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

The present invention discloses a conductor device, that in one embodiment is planar, and RFID chip that is folded to create a coil to form an RFID tag. The result is the formation of a coil such as a solenoid coil, not planar, which allows the device to be placed against metal. Specifically, an RFID chip is connected to a planar structure. The planar structure is then folded into a concertina fold. After folding, a spiral conductor is formed in one direction, forming a coil with the RFID chip connected to both ends. In one embodiment, the present invention contemplates that the spiral conductor is formed in the Z direction. This structure operates as a resonant RFID tag.

Figure 1:
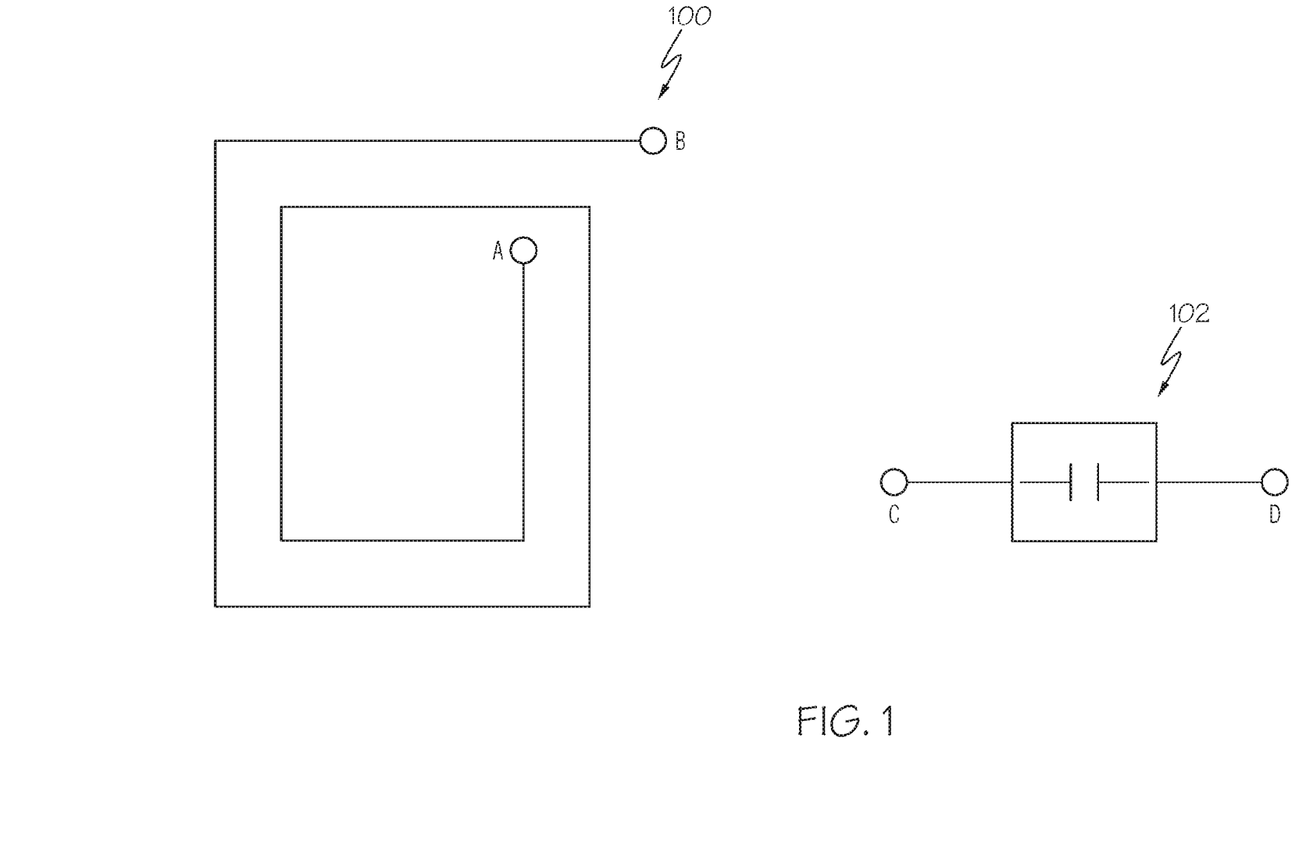
FIG. 1 illustrates a top perspective view of the standard coil device designed to resonate with an RFID chip in accordance with the disclosed architecture.

Referring initially to the drawings, FIG. 1 illustrates the structure of a standard coil device 100 designed to resonate with an RFID chip 102. Typically, the standard coil device 100 is a planar coil but the standard coil device 100 can be any suitable size, shape, and configuration as is known in the art without affecting the overall concept of the invention. One of ordinary skill in the art will appreciate that the shape and size of the standard coil device 100 as shown in FIG. 1 is for illustrative purposes only and many other shapes and sizes of the standard coil device 100 are well within the scope of the present disclosure. Although dimensions of the standard coil device 100 (i.e., length, width, and height) are important design parameters for good performance, the standard coil device 100 may be any shape or size that ensures optimal performance during use.

The standard coil device 100 forms a planar spiral. To form a resonant circuit the RFID chip 102 with a capacitance between A and B must connect to the two ends of the coil C and D that are resonant at or close to the wanted frequency. In this simplified circuit, the effects of resistance have been ignored as they primarily affect the quality factor. Further, in this circuit the operational frequency is when the inductance between A and B is resonant with the inductance between C and D.

Additionally, the standard coil device 100 is especially suitable for both ultra-high frequency (UHF) and high frequency (HF) tags depending on the wants and needs of a user. Accordingly, the present specification makes specific reference thereto. However, it is to be appreciated that aspects of the present inventive subject matter are also equally amenable to other like applications as are known in the art.

Figure 2A:
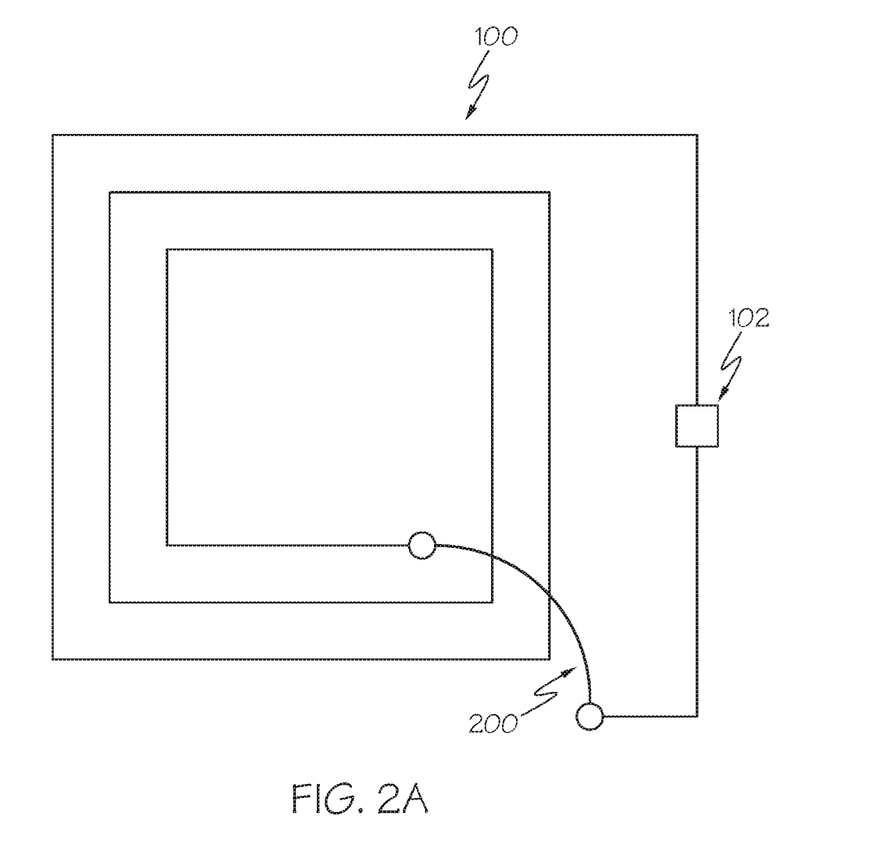
FIG. 2A illustrates a top perspective view of the standard coil device with an additional conductor added to allow the RFID chip to connect to the inside and the outside of the coil in accordance with the disclosed architecture.

Further, the connection in a standard HF RFID tag can be achieved in a number of ways. For example, as shown in FIG. 2A, an additional conductor bridge 200 can be added to allow the RFID chip 102 to connect to the inside and outside of the coil device 100. Specifically, the additional conductor 200 forms a bridge from the center of the coil device 100 to the outside of the RFID chip 102 to make a connection and create a conductive bridge.

Figure 2B:
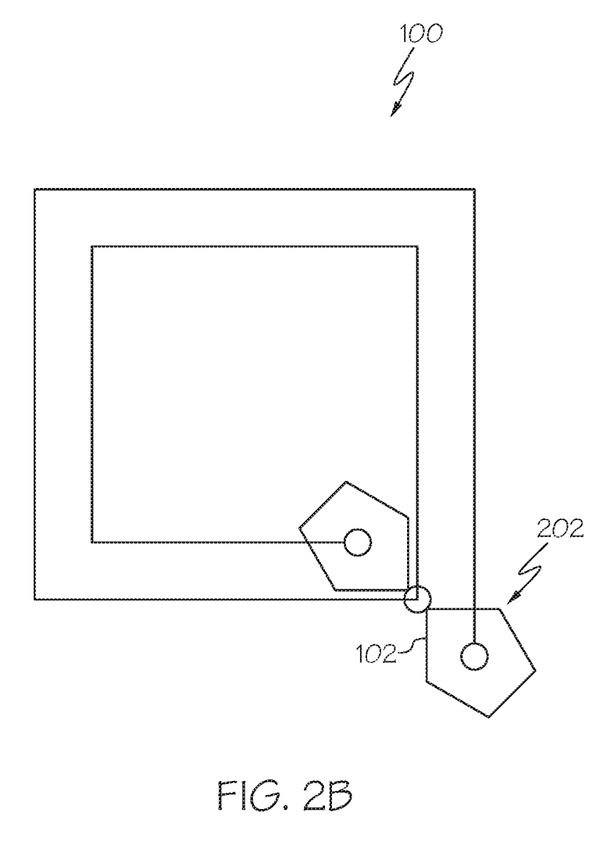
FIG. 2B illustrates a top perspective view of the standard coil device with the RFID chip placed on a strap which then bridges the coil to allow connections to both ends in accordance with the disclosed architecture.

Alternatively, as shown in FIG. 2B, the RFID chip 102 can be placed on a strap 202 which then itself bridges the coil device 100 to allow connections to both ends. Thus, the strap 202 carries the RFID chip 102 and is positioned to form a bridge from the center of the coil device 100 to the outside of the RFID chip 102. Accordingly, in both of these methods shown in FIGS. 2A and 2B, additional joints (in the form of a bridge 200 or a strap 202) need to be made to complete the resonant circuit, and the bridge 200 or strap 202 must be made large enough to cross the width of the coil device 100.

However, the disclosed planar conductor device is folded on itself to create a coil to attach to an RFID chip to form an RFID tag. The coil is created by folding a planar component which allows a single joint on a simple planar component to create an RFID tag. As no bridges or straps are required, the planar conductor device can be made of paper and aluminum foil, or any other suitable material as is known in the art, with a minimum of other materials improving its recyclability.

Figure 3:
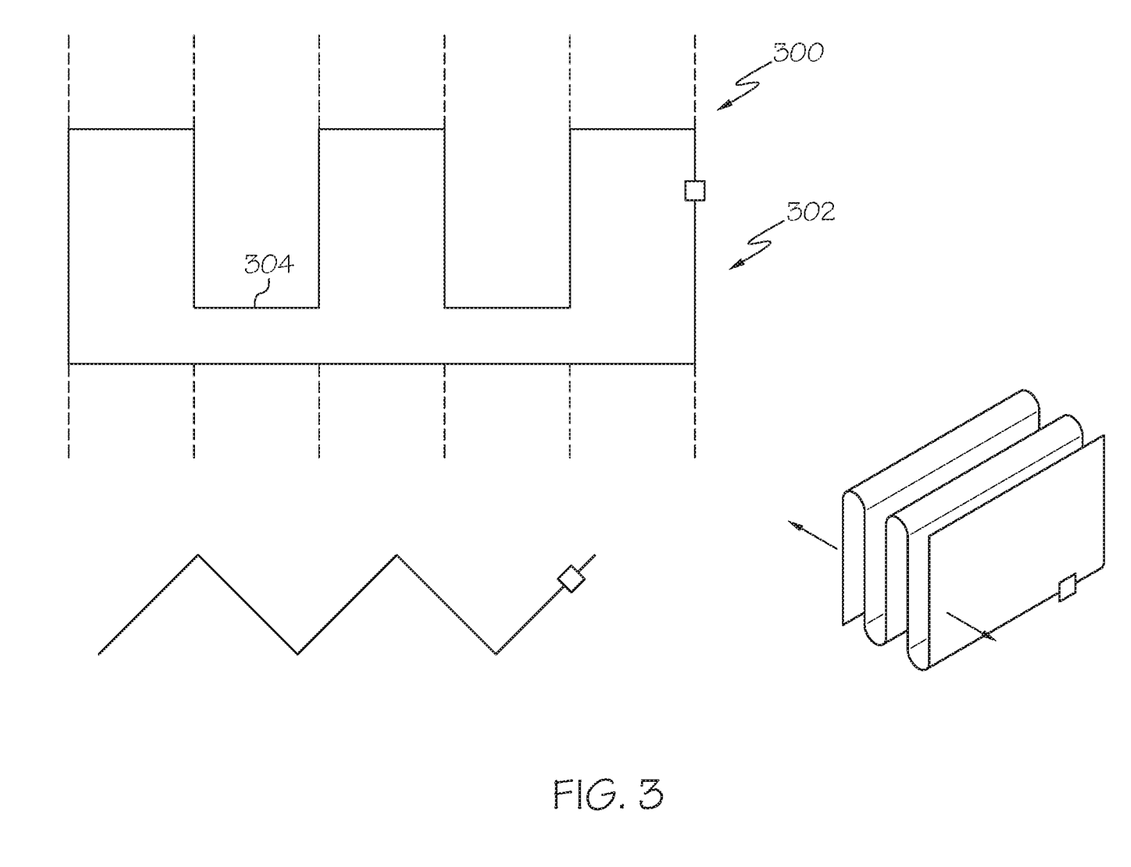
FIG. 3 illustrates a front perspective view of the planar device folded forming a coil in accordance with the disclosed architecture.

FIG. 3 illustrates the basic structure of the planar device 300. The planar device 300 comprises a meandering conductive trace 304. The meandering conductive trace 304 is formed by a number of suitable means, such as etching, laser cutting, die cutting, or any other suitable means as is known in the art for creating a conductive trace. An RFID chip 302 is connected to the planar device 300 as shown in FIG. 3. Specifically, the RFID chip 302 is connected to the planar device 300 via direct chip attach, strap, or any other suitable means as is known in the art. The planar device 300 is then folded in a concertina or accordion type fold, a zig-zag fold, or a z-fold. Specifically, the planar device 300 is folded in a continuous parallel arrangement, in an accordion-like fashion with folds alternatively made to the front and back in zig-zag folds. Examining the device 300 after folding, a user now has a spiral of a conductor in the Z direction, forming a solenoid coil, with the RFID chip 302 connected to both ends. This device 300 can operate as a resonant RFID tag.

Figure 4:
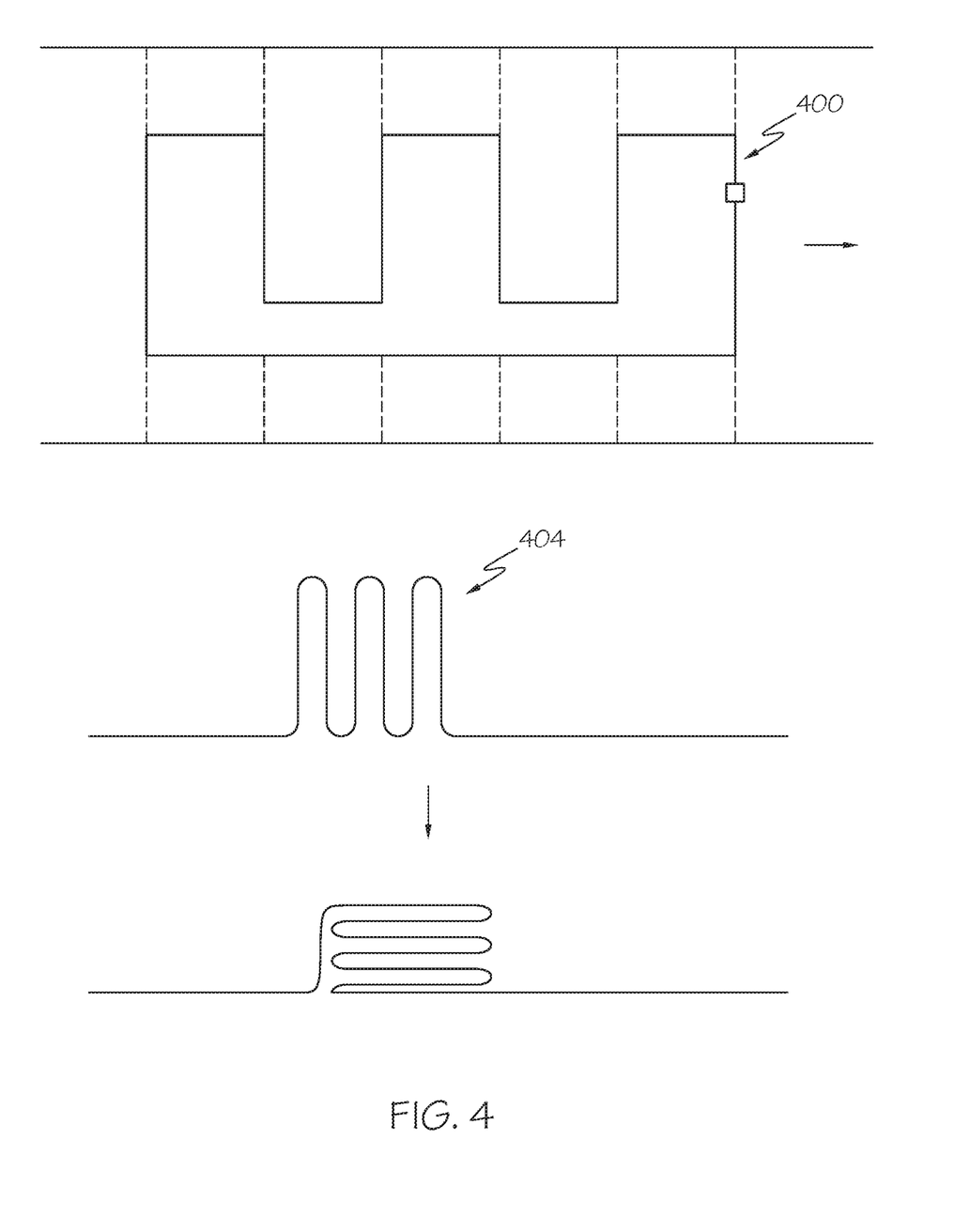
FIG. 4 illustrates a front perspective view of the planar device folded in a cross-web direction to form the coil in accordance with the disclosed architecture.

FIG. 4 illustrates how the web 400 carrying the planar antenna can be folded in the cross-web direction to form concertina coil elements 404. Generally, the RFID chip 402 will be applied in the planar state before folding. Then, the web 400 is folded in a cross-web direction to form the concertina coil elements 404. The concertina coil elements 404 are then flattened to create a printable surface.

Figure 5:
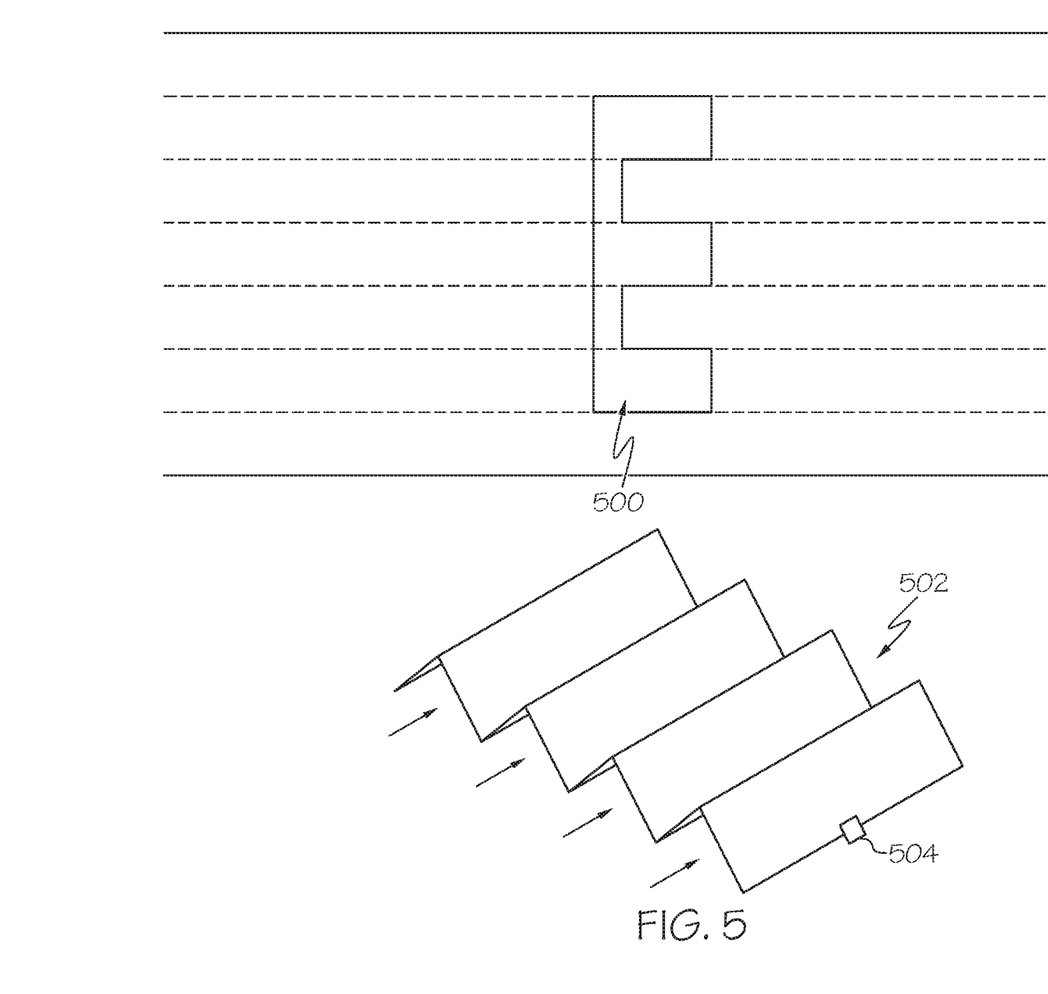
FIG. 5 illustrates a front perspective view of the planar device folded in the web direction to form the coil in accordance with the disclosed architecture.

FIG. 5 illustrates the web 500 carrying the planar antenna folded in the web direction to form a coil strip 502. Once again, the RFID chip 504 is typically applied in the planar state before folding. Then, the web 500 is folded in the direction of the web 500 to form a concertina coil strip 502. The concertina coil strip 502 can then be flattened to create a printable surface.

Figure 6:
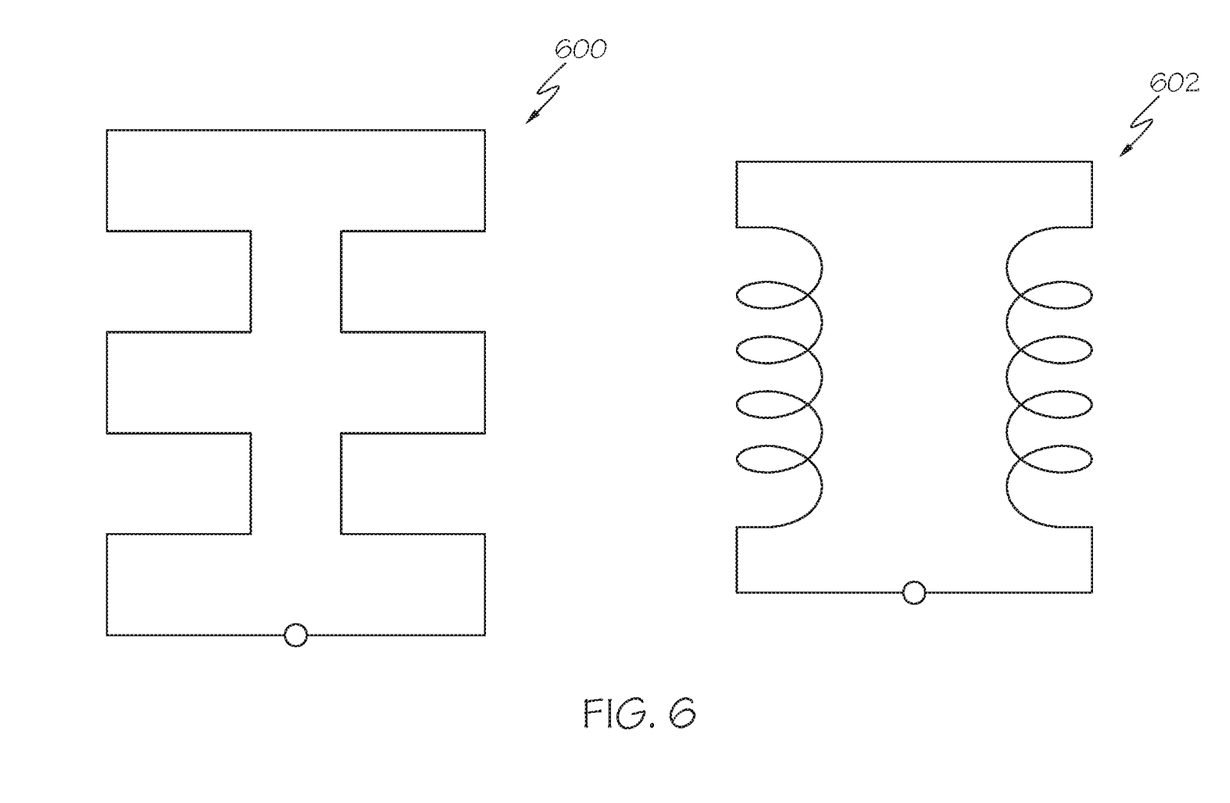
FIG. 6 illustrates a top perspective view of the planar device folded to produce two coils in series in accordance with the disclosed architecture.

FIG. 6 illustrates a planar device 600 that when folded produces two adjacent coils in series 602. These coils allow an increase in inductance to be achieved with two read zones, one over each coil, with a null zone in between as the reader system equally passes current through the coils. Variables such as the spacing between coils when folded can be altered to suit user preference. Further, winding the coils clockwise and counterclockwise creates a common field that produces differential voltage. Thus, the structure essentially trades length of the planar device 600 for the number of turns when folded in a given area and thickness, as each turn adds the thickness of the planar device 600. This increased thickness potentially makes it suitable for additional applications such as transportation ticketing. Furthermore, how compressed the coil is changes the frequency of the structure, so potentially with the right adhesive, a nip pressure can be used to tune the RFID tag in production to remove unwanted variability.

Generally, the disclosed device and method creates a very thin rectangular coil, for example approximately 1.0 mm thick by 20 mm long. However, this coil is a solenoid coil, not planar, which allows this device to be placed against metal more successfully than a planar coil. Thus, an RFID tag starting as a planar structure, with an RFID chip attached to it, when folded, can be read by a mobile phone.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A device forming a radio-frequency identification (RFID) tag comprising:
   a conductor component; and
   an RFID chip secured to the conductor component, wherein the conductor component is folded to form at least two adjacent coils, wherein the at least two adjacent coils are in series.

2. The device of claim 1, wherein the conductor component is planar.

3. The device of claim 1, wherein the conductor component is folded into a concertina fold.

4. The device of claim 1, wherein the folded conductor component forms a solenoid coil.

5. The device of claim 1, wherein the conductor component comprises a meandering conductive trace.

6. The device of claim 5, wherein the meandering conductive trace is formed by at least one of etching, laser cutting or die cutting.

7. The device of claim 1, wherein the conductor component is comprised of paper or aluminum foil.

8. The device of claim 1, wherein the conductor component is folded in a cross-web direction to form concertina coil elements.

9. The device of claim 1, wherein the conductor component is folded in a web direction to form concertina coil elements.

10. A device forming a radio-frequency identification (RFID) tag, comprising:
    a planar conductor component; and
    an RFID chip secured to the planar conductor component, wherein the planar conductor component is folded to produce two adjacent coils in series.

11. The device of claim 10, wherein the two adjacent coils produce two read zones, one read zone over each of said two adjacent coils.

12. The device of claim 11 further comprising a null zone between the two read zones, with current equally passing through the two adjacent coils.

* * * * *